US012789503B2

(12) United States Patent
Long

(10) Patent No.: US 12,789,503 B2
(45) Date of Patent: Nov. 10, 2026

(54) POLYURETHANE COMPOSITE FLOOR AND FABRICATION PROCESS THEREFOR

(71) Applicant: Zhongjiang Long, ShenZhen (CN)

(72) Inventor: Zhongjiang Long, ShenZhen (CN)

( * ) Notice: Subject to any disclaimer, the term of this patent is extended or adjusted under 35 U.S.C. 154(b) by 191 days.

(21) Appl. No.: 17/925,012

(22) PCT Filed: Jun. 2, 2020

(86) PCT No.: PCT/CN2020/093943

§ 371 (c)(1),
(2) Date: Nov. 14, 2022

(87) PCT Pub. No.: WO2021/227145

PCT Pub. Date: Nov. 18, 2021

(65) Prior Publication Data

US 2023/0182437 A1 Jun. 15, 2023

(30) Foreign Application Priority Data

May 15, 2020 (CN) ......................... 202010415330.2

(51) Int. Cl.
*B32B 5/20* (2006.01)
*B32B 5/24* (2006.01)
(Continued)

(52) U.S. Cl.
CPC ................ *B32B 5/245* (2013.01); *B32B 5/20* (2013.01); *B32B 25/10* (2013.01);
(Continued)

(58) Field of Classification Search
CPC ... B32B 2260/021; B32B 15/14; B32B 27/12; B32B 25/10; B32B 5/18; B32B 5/245;
(Continued)

(56) References Cited

U.S. PATENT DOCUMENTS

2011/0111192 A1* 5/2011 Lloveras Calvo ........ B32B 9/04 428/339
2013/0299273 A1* 11/2013 Freedman ............. E04F 15/105 181/290
(Continued)

FOREIGN PATENT DOCUMENTS

CN 202017320 U 10/2011
CN 202131751 U * 2/2012
(Continued)

OTHER PUBLICATIONS

English Language Translation of CN-202131751-U (Year: 2012).*
English Language Translation of CN-204095924-U (Year: 2015).*

*Primary Examiner* — Maria V Ewald
*Assistant Examiner* — Daniel P Dillon
(74) *Attorney, Agent, or Firm* — Justin Lampel

(57) ABSTRACT

The present disclosure relates to the technical field of composite structures, and provides a polyurethane composite floor. The polyurethane composite floor includes a foamed layer and a decorative layer arranged on the foamed layer, the foamed layer comprises an intermediate core material, two braided fibre layers respectively arranged on a top portion and a lower portion of the intermediate core material, the intermediate core material defines a plurality of filling gaps, each filling gap is filled with a rigid polyurethane foam. The polyurethane composite floor has the advantages of low cost, strong weather resistance, and wide adaptability, and the chemical internal energies of self-reactions of the rubber elastomer layer and the polyurethane foaming material can be used to catalyze and cure mutually, which greatly saves the production energy consumption, and avoids the use of glue, the polyurethane composite floor is much more environmentally friendly and durable.

8 Claims, 2 Drawing Sheets

(51) Int. Cl.

| | |
|---|---|
| ***B32B 15/14*** | (2006.01) |
| ***B32B 25/10*** | (2006.01) |
| ***B32B 38/00*** | (2006.01) |
| ***C08G 18/72*** | (2006.01) |

(52) U.S. Cl.
CPC ....... *B32B 2255/10* (2013.01); *B32B 2255/28* (2013.01); *B32B 2262/101* (2013.01); *B32B 2266/0278* (2013.01); *B32B 2419/00* (2013.01)

(58) Field of Classification Search
CPC ..... B32B 2419/04; B32B 15/18; B32B 15/20; B32B 2255/10; B32B 2255/28; B32B 2260/048; B32B 2262/0269; B32B 2262/06; B32B 2262/10; B32B 2262/101; B32B 2262/103; B32B 2266/0278; B32B 2307/102; B32B 2307/304; B32B 2307/762; B32B 2419/00; B32B 27/302; B32B 27/304; B32B 27/32; B32B 27/36; B32B 27/365; B32B 3/12; B32B 5/024; B32B 5/20; C08G 2110/0025; B29C 44/00; C08J 9/00
See application file for complete search history.

(56) References Cited

U.S. PATENT DOCUMENTS

| | | | | |
|---|---|---|---|---|
| 2015/0225946 | A1 | 8/2015 | Dickey et al. | |
| 2016/0251491 | A1* | 9/2016 | Okada | C08J 9/146 252/62 |
| 2019/0185610 | A1* | 6/2019 | Niu | C08J 5/042 |

FOREIGN PATENT DOCUMENTS

| | | | | |
|---|---|---|---|---|
| CN | 203317831 | U | | 12/2013 |
| CN | 104191740 | A | | 12/2014 |
| CN | 204095924 | U | * | 1/2015 |
| CN | 104742460 | A | | 7/2015 |
| CN | 204475783 | U | | 7/2015 |
| CN | 209261144 | U | | 8/2019 |
| CN | 110466230 | A | | 11/2019 |
| JP | 2010229788 | A | | 10/2010 |
| JP | 2012224979 | A | | 11/2012 |

* cited by examiner

POLYURETHANE COMPOSITE FLOOR AND FABRICATION PROCESS THEREFOR

TECHNICAL FIELD

The present disclosure relates to the technical field of composite structures, in particular to a polyurethane composite floor, and a method for manufacturing the polyurethane composite floor.

BACKGROUND

With the continuous development of the economy, people's living standards have been greatly improved, but the natural resources have been extremely consumed at the same time, and the earth's forest coverage is constantly decreasing. In the face of the increasing scarcity of solid wood resources, the global warming and the rising of sea level and other globalization issues bring greatly effects. The environment in which human beings live is under greater threat than ever before.

Currently, the solid wood floor, the PVC floor, and the PE wood plastic floor on the market, have many defects. For example, the floors are easy to shrink and deform, pulverize and collapse, age and crack, and mildew, and have many other long-standing problems, the use effect of the wood plastic floor is bad, and the service life of the wood plastic floor is short, so the existing floor cannot meet the long-term use needs of different outdoor environments.

SUMMARY

In view of the problems in the above prior art, the present disclosure provides a polyurethane composite floor and its manufacturing method, the polyurethane composite floor has the advantages of low cost, strong weather resistance, and wide adaptability, and the polyurethane composite floor may be integrally-formed by a mold, the chemical internal energies of self-reactions of the rubber elastomer layer and the polyurethane foaming material can be used to catalyze and cure mutually, which greatly saves the production energy consumption, and avoids the use of glue, the polyurethane composite floor is much more environmentally friendly and durable, and the processing process is simple.

The technical solutions in the present disclosure include:

As shown in FIG. 1, the polyurethane composite floor includes a foamed layer and a decorative layer arranged on the foamed layer, the foamed layer includes an intermediate core material, two braided fibre layers respectively arranged on a top portion and a lower portion of the intermediate core material, the braided fibre layer arranged on the top portion of the intermediate core material is defined as an upper braided fibre layer, the braided fibre layer arranged on the lower portion of the intermediate core material is defined as a lower braided fibre layer, the intermediate core material defines a plurality of filling gaps, each filling gap is filled with a rigid polyurethane foam.

Because the plate is cured after a foaming reaction, so the plate has sound insulation and heat insulation. In addition, the braided fibre layer provides a horizontal and transverse bending force support for the plate, and the intermediate core material provides a longitudinal compression support for the plate, so that the overall mechanical properties of the plate are more excellent, the cost is lower, and thus the plate is more competitive in the market.

It should be noted that, the shape of the product can be freely designed to meet different usage scenarios. In the specific design of the product, the layer number and the laying direction of the braided fibre layer and the layer number of the intermediate core material can be flexibly added and designed according to the actual mechanical needs to meet different use needs. That is to say, the shape and mechanical structure of the product can be freely designed according to needs to meet the application needs of different scenarios and have wide adaptability.

Specifically, the layer numbers and the laying directions of the upper braided fiber layer and the lower braided fiber layer and the layer number and the laying direction of the intermediate core material can be flexibly added and designed according to the actual mechanical needs. The upper braided fiber layer and the lower braided fiber layer are in a transverse plane extension state, the intermediate core material is a longitudinal support, that is, the whole is H-shaped. Of course, it has an H-shaped single-layer structure, or it has multiple H-shaped structures. The single H-shaped structure is a sandwich structure and includes the intermediate core material, the upper braided fiber layer and the lower braided fiber layer respectively arranged on the top portion and the lower portion of the intermediate core material, and the multiple H-shaped structures are also sandwich structures, there are multiple braided fibre layers between the two intermediate core materials, and a surface of the intermediate core material is also provided with the braided fibre layer.

Due to the foamed layer, compared with log, the product has better dimensional stability, corrosion resistance, insect resistance, moisture resistance, high material utilization, very low VOCs release, so the product is environmentally friendly and recyclable.

As we adopts a molding technology capable of presenting the wood texture, the log template is processed to obtain a wood texture template, and then the wood texture template is somersaulted to the mold, and finally the wood texture is molded on each surface of the product by the mold. The appearance of the bottom plate of the composite structure is much more natural and beautiful, and the product has a better wood feeling compared with the traditional wood-plastic products.

While the product retains the natural wood sense with high vitality, and also overcomes the fatal weakness, which are occurred when the logs expose in actual environment, such as deformation due to water, mildew, cracking, warping, flammable, susceptible to pest and fungal erosion and other fatal weaknesses, etc.

Furthermore, the rigid polyurethane foam is composed of following components by weight: polyether polyol 40~60 parts, isocyanate 40~60 parts, filler 10~30 parts, coupling agent 3~6 parts, fire retardant 8~16 parts, and additive 3~6 parts.

Furthermore, the rigid polyurethane foam is composed of following components by weight: polyether polyol 40 parts, isocyanate 40 parts, filler 10 parts, coupling agent 3 parts, fire retardant 8 parts, and additive 3 parts.

Furthermore, the rigid polyurethane foam is composed of following components by weight: polyether polyol 60 parts, isocyanate 60 parts, filler 30 parts, coupling agent 6 parts, fire retardant 16 parts, and additive 6 parts.

Furthermore, the rigid polyurethane foam is composed of following components by weight: polyether polyol 50 parts, isocyanate 50 parts, filler 20 parts, coupling agent 5 parts, fire retardant 12 parts, and additive 5 parts.

The additive is at least one selected from dispersing agent, film-forming agent, thickener, defoamer, active agent, penetrant, color matching agent, and suspending agent, and the filler is at least one selected from sand, cement, quartz powder, calcium powder, talcum powder, fly ash, mineral powder and silica ash.

Furthermore, the braided fibre layer is at least one selected from artificial fiber, metal alloy wire, aramid fiber, quartz fiber, glass fiber, basalt fiber, and plant paper fiber.

Furthermore, the intermediate core material is made of polymer material, metal material, organic biological material, or inorganic material.

Specifically, the polymer material may be PP, PE, PET, PC, ABS or PVC, the metal material may be copper, aluminum, steel, or alloy.

It should be noted that the intermediate core material may be a honeycombed core material or a grid core material, or other porous core materials.

Furthermore, the decorative layer includes a rubber elastomer layer, a primer layer, a top paint layer, and a protective paint layer which are arranged in sequence from bottom to top.

Because of the rubber elastomer layer is composited in the product, when a nail is driven into the composite floor, the rubber elastomer layer may automatically repair as the rubber elastomer layer has rebound resilience, so as to cover and hide a tail of the nail. Therefore, the product has better decorative effect, the resources are saved, the product is durable, its outdoor service life can be more than 20 years, and the product can be recycled twice, and the problem of lacking solid wood is well solved.

The present disclosure further provides a method for manufacturing a polyurethane composite floor, which includes the following steps:

A. spraying a release agent into a lower mold, spraying a protective paint layer, rolling a top paint layer, and spraying a primer layer sequentially;

B. after the layers are dried, pouring elastic rubber materials in the lower mold, and forming a semi-cured rubber elastomer layer;

C. placing an upper braided fibre layer on the rubber elastomer layer, and realizing a preimpregnation of fibers on an upper surface of the rubber elastomer layer into the upper braided fibre layer;

D. pouring polyurethane foaming material in the lower mold, the polyurethane foaming material is fully infiltrated with the fibers in a lower surface of the upper braided fibre layer;

The polyurethane foaming material is obtained by uniformly mixing following components in a mixing device by weight: polyether polyol 40~60 parts, isocyanate 40~60 parts, filler 10~30 parts, coupling agent 3~6 parts, fire retardant 8~16 parts, and additive 3~6 parts. Finally the polyurethane foaming material is poured into the mold;

E. after pouring polyurethane foaming material in the lower mold, placing an intermediate core material in the lower mold;

F. placing lower braided fibre layer on the intermediate core material;

G. closing the mold and curing;

H. demoulding and cleaning the mold;

I. removing excess flash, and obtaining the polyurethane composite floor.

Because the foamed layer, the rubber elastomer layer, the primer layer, the top paint layer, and the protective paint layer are integrally formed by the mold, the chemical internal energies of self-reactions of the rubber elastomer layer and the polyurethane foaming material can be used to catalyze and cure mutually, which greatly saves the production energy consumption, and avoids the use of glue, the polyurethane composite floor is much more environmentally friendly and durable, and the processing process is simple.

The polyurethane foaming material is injected into the mold after the mold is closed, and the polyurethane foaming material foams and expands, and creates a molding environment with high temperature and high pressure in the mold. The upper braided fiber layer and the lower braided fiber layer are fixed on the intermediate core material by the polyurethane foaming material. Since the intermediate core material has the filling gaps, the polyurethane foaming material is filled in the filling gaps, so as to solve the problem of low strength at the filling gap, the intermediate core material and braided fiber layers form a whole, and the overall strength of the composite floor is increased.

It should be noted that, the polyurethane foaming material releases a lot of heat in the foaming process after the mold is closed, the volume becomes larger, and the mold cavity may be in a high pressure due to the limitation of the mold. In the high-temperature and high-pressure molding process, a surface of the polyurethane foaming material in contact with the upper mold may generate a crust due to the temperature difference of the molding surface of the upper mold, the crust has high density and higher strength. So, the lower surface of the product has higher strength, and the lower braided fiber layer is bound with the crust, and the lower braided fiber layer is fixed more firmly, which makes the whole product have higher strength. To sum up, the method utilizes the chemical internal energies of the self-reactions to carry out the catalyzing and curing, which greatly saves the production energy consumption and production cost.

The present disclosure has the following advantages: the plate is cured after a foaming reaction, so the plate has sound insulation and heat insulation. In addition, the braided fibre layer provides a horizontal and transverse bending force support for the plate, and the intermediate core material provides a longitudinal compression support for the plate, so that the overall mechanical properties of the plate are more excellent, the cost is lower, and thus the plate is more competitive in the market.

It should be noted that, the shape of the product can be freely designed to meet different usage scenarios. In the specific design of the product, the layer number and the laying direction of the braided fibre layer and the layer number of the intermediate core material can be flexibly added and designed according to the actual mechanical needs to meet different use needs. That is to say, the shape and mechanical structure of the product can be freely designed according to needs to meet the application needs of different scenarios and have wide adaptability.

Specifically, the layer numbers and the laying directions of the upper braided fiber layer and the lower braided fiber layer and the layer number and the laying direction of the intermediate core material can be flexibly added and designed according to the actual mechanical needs. The upper braided fiber layer and the lower braided fiber layer are in a transverse plane extension state, the intermediate core material is a longitudinal support, that is, the whole is H-shaped. Of course, it has an H-shaped single-layer structure, or it has multiple H-shaped structure. The single H-shaped structure is a sandwich structure and includes the intermediate core material, the upper braided fiber layer and the lower braided fiber layer respectively arranged on the upper portion and the lower portion of the intermediate core material, and the multiple H-shaped structures are also sandwich structures, there are multiple braided fibre layers between the two intermediate core materials, and a surface of the intermediate core material is also provided with the braided fibre layer.

Due to the foamed layer, compared with log, the product has better dimensional stability, corrosion resistance, insect resistance, moisture resistance, high material utilization, very low VOCs release, so the product is environmentally friendly and recyclable.

As we adopted a molding technology capable of presenting the wood texture, the log template is processed to obtain a wood texture template, and then the wood texture template is somersaulted to the mold, and finally the wood texture is molded on each surface of the product by the mold. The appearance of the bottom plate of the composite structure is much more natural and beautiful, and the product has a better wood feeling compared with the traditional wood-plastic products.

While the product retains the natural wood sense with high vitality, and also overcomes the fatal weakness, which are occurred when the logs exposed in actual environment, such as deformation due to water, mildew, cracking, warping, flammable, susceptible to pest and fungal erosion and other fatal weaknesses, etc.

In addition, because the foamed layer, the rubber elastomer layer, the primer layer, the top paint layer, and the protective paint layer are integrally formed by the mold, the chemical internal energies of self-reactions of the rubber elastomer layer and the polyurethane foaming material can be used to catalyze and cure mutually, which greatly saves the production energy consumption, and avoids the use of glue, the polyurethane composite floor is much more environmentally friendly and durable, and the processing process is simple.

The polyurethane foaming material is injected into the mold after the mold is closed, and the polyurethane foaming material foams and expands, and creates a molding environment with high temperature and high pressure in the mold. The upper braided fiber layer and the lower braided fiber layer are fixed on the intermediate core material by the polyurethane foaming material. Since the intermediate core material has the filling gaps, the polyurethane foaming material is filled in the filling gaps, so as to solve the problem of low strength at the filling gap, the intermediate core material and braided fiber layers form a whole, and the overall strength of the composite floor is increased.

It should be noted that, the polyurethane foaming material releases a lot of heat in the foaming process after the mold is closed, the volume becomes larger, and the mold cavity may be in a high pressure due to the limitation of the mold. In the high-temperature and high-pressure molding process, a surface of the polyurethane foaming material in contact with the upper mold may generate a crust due to the temperature difference of the molding surface of the upper mold, the crust has high density and higher strength. So, the lower surface of the product has higher strength, and the lower braided fiber layer is bound with the crust, and the lower braided fiber layer is fixed more firmly, which makes the whole product have higher strength. To sum up, the method utilizes the chemical internal energy of the self-reactions of rubber elastomer layer and the foamed layer to carry out the catalyze and cure, which greatly saves the production energy consumption and production cost.

Figure 1:
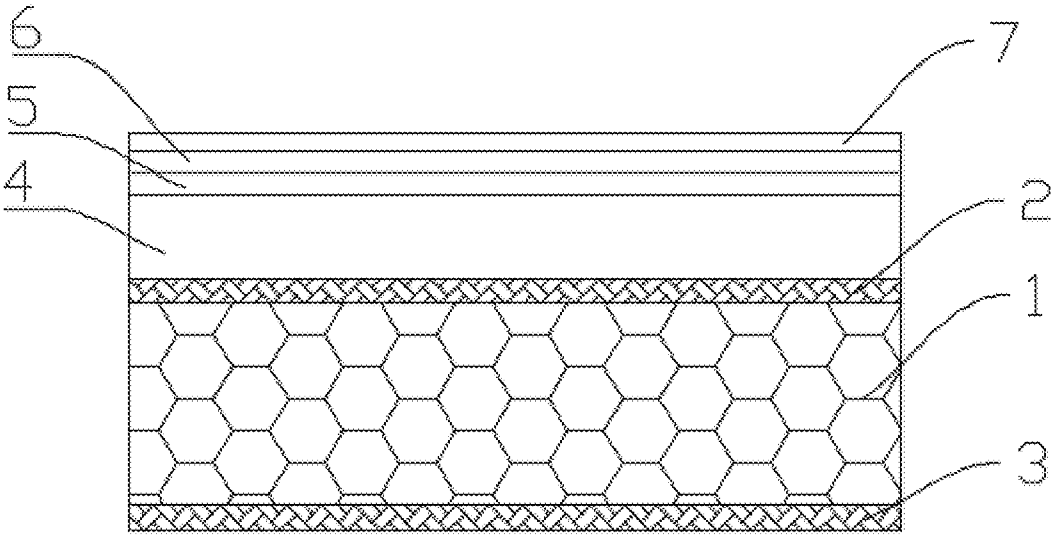
FIG. 1 is a structural diagram of a polyurethane composite floor according to the present disclosure.

In the figures: intermediate core material 1; upper braided fibre layer 2; lower braided fibre layer 3; rubber layer 4; primer layer 5; top paint layer 6; protective paint layer 7.

DETAILED DESCRIPTION OF THE EMBODIMENTS

In order to make the purposes, technical solutions, and advantages of the embodiment of the present disclosure more clear, the technical solutions in the embodiments of the present disclosure are described clearly and completely in combination with the drawings attached to the embodiment of the present disclosure. Obviously, the embodiments described are parts of the embodiments of the present disclosure, but not the whole embodiment. The components of embodiments of the present disclosure generally described and shown in the drawings attached herein may be laid out and designed in a variety of different configurations.

Therefore, the following detailed description of embodiments of the present disclosure provided in the attached drawings is not intended to limit the protection scope of the present disclosure, but rather represents only selected embodiments of the present disclosure. Based on the embodiments of the present disclosure, all other embodiments obtained by ordinary technicians in the field without creative labor fall within the protection scope of the present disclosure.

It should be noted that, the features in different embodiments may be combined with each other when there is no conflict The present disclosure is further described in combination with the attached drawings and specific embodiments.

The First Embodiment

Referring to FIG. 1, the embodiment of the present disclosure provides a polyurethane composite floor, which includes: a foamed layer and a decorative layer arranged on the foamed layer, the foamed layer includes an intermediate core material 1, two braided fibre layers respectively arranged on a top portion and a lower portion of the intermediate core material 1, the braided fibre layer arranged on the top end of the intermediate core material 1 is defined as an upper braided fibre layer 2, the braided fibre layer arranged on the lower end of the intermediate core material 1 is defined as a lower braided fibre layer 3, the intermediate core material 1 defines a plurality of filling gaps, each filling gap is filled with a rigid polyurethane foam.

Because the plate is cured after a foaming reaction, so the plate has sound insulation and heat insulation. In addition, the braided fibre layer provides a horizontal and transverse bending force support for the plate, and the intermediate core material 1 provides a longitudinal compression support for the plate, so that the overall mechanical properties of the plate are more excellent, the cost is lower, and thus the plate is more competitive in the market.

It should be noted that, the shape of the product can be freely designed to meet different usage scenarios. In the specific design of the product, the layer number and the laying direction of the braided fibre layer and the layer number of the intermediate core material 1 can be flexibly added and designed according to the actual mechanical needs to meet different use needs. That is to say, the shape and mechanical structure of the product can be freely designed according to needs to meet the application needs of different scenarios and have wide adaptability.

Figure 2:
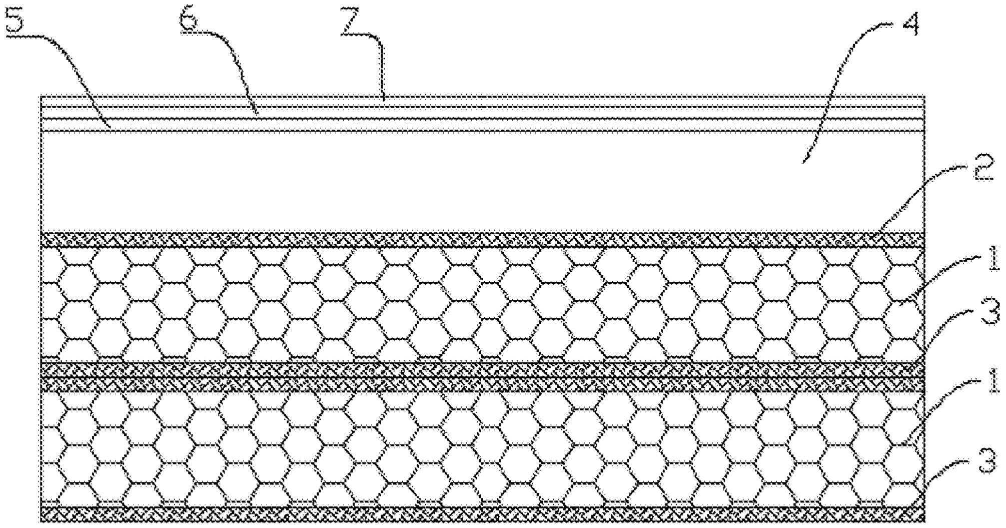
FIG. 2 is another structural diagram of a polyurethane composite floor according to the present disclosure.

As shown in FIG. 2, the layer numbers and the laying directions of the upper braided fiber layer 2 and the lower braided fiber layer 3 and the layer number and the laying direction of the intermediate core material 1 can be flexibly added and designed according to the actual mechanical needs. The upper braided fiber layer 2 and the lower braided fiber layer 3 are in a transverse plane extension state, the intermediate core material 1 is a longitudinal support, that is, the whole is H-shaped. Of course, it has an H-shaped single-layer structure, or it has multiple H-shaped structure. The single H-shaped structure is a sandwich structure and includes the intermediate core material 2, the upper braided fiber layer 3 and the lower braided fiber 3 layer respectively arranged on the upper portion and the lower portion of the intermediate core material 1, and the multiple H-shaped structures are also sandwich structures, there are multiple braided fibre layers between the two intermediate core materials 1, and a surface of the intermediate core material 1 is also provided with the braided fibre layer.

Due to the foamed layer, compared with log, the product has better dimensional stability, corrosion resistance, insect resistance, moisture resistance, high material utilization, very low VOCs release, so the product is environmentally friendly and recyclable.

As we adopted a molding technology capable of presenting the wood texture, the log template is processed to obtain a wood texture template, and then the wood texture template is somersaulted to the mold, and finally the wood texture is molded on each surface of the product by the mold. The appearance of the bottom plate of the composite structure is much more natural and beautiful, and the product has a better wood feeling compared with the traditional wood-plastic products.

While the product retains the natural wood sense with high vitality, and also overcomes the fatal weakness, which are occurred when the logs exposed in actual environment, such as deformation due to water, mildew, cracking, warping, flammable, susceptible to pest and fungal erosion and other fatal weaknesses, etc.

The Second Embodiment

This embodiment is optimized on the basis of the first embodiment.

The rigid polyurethane foam is composed of following components by weight: polyether polyol 50 parts, isocyanate 50 parts, filler 20 parts, coupling agent 5 parts, 12 parts, and additive 5 parts. The additive is at least one selected from dispersing agent, film-forming agent, thickener, defoamer, active agent, penetrant, color matching agent, and suspending agent, and the filler in the embodiment is at least one selected from sand, cement, quartz powder, calcium powder, talcum powder, fly ash, mineral powder and silica ash. In the embodiment, the mineral powder is selected.

The Third Embodiment

This embodiment is optimized on the basis of the second embodiment.

The rigid polyurethane foam is composed of following components by weight: polyether polyol 40 parts, isocyanate 40 parts, filler 10 parts, coupling agent 3 parts, fire retardant 8 parts, and additive 3 parts.

The Fourth Embodiment

This embodiment is optimized on the basis of the second embodiment.

The rigid polyurethane foam is composed of following components by weight: polyether polyol 60 parts, isocyanate 60 parts, filler 30 parts, coupling agent 6 parts, fire retardant 16 parts, and additive 6 parts.

The Fifth Embodiment

This embodiment is optimized on the basis of the second embodiment.

The braided fibre layer is at least one selected from artificial fiber, metal alloy wire, aramid fiber, quartz fiber, glass fiber, basalt fiber, and plant paper fiber. In the embodiment, the braided fibre layer 2 is made of glass fiber.

The Sixth Embodiment

This embodiment is optimized on the basis of the first embodiment.

The intermediate core material 1 is made of polymer material, metal material, organic biological material, or inorganic material. In the embodiment, the intermediate core material 1 is made of polymer material.

Specifically, the polymer material may be PP, PE, PET, PC, ABS or PVC, the metal material may be copper, aluminum, steel, or alloy. In the embodiment, the intermediate core material 1 is made of PP.

It should be noted that the intermediate core material 1 may be a honeycombed core material or a grid core material, or other porous core materials. In the embodiment, the intermediate core material 1 is the honeycombed core material.

The Seventh Embodiment

This embodiment is optimized on the basis of the first embodiment.

Furthermore, the decorative layer includes a rubber elastomer layer 4, a primer layer 5, a top paint layer 6, and a protective paint layer 7 which are arranged in sequence from bottom to top.

Because of the rubber elastomer layer 4 is composited in the product, when a nail is driven into the composite floor, the rubber elastomer layer 4 may automatically repair as the rubber elastomer layer 4 has rebound resilience, so as to cover and hide a tail of the nail. Therefore, the product has better decorative effect, the resources are saved, the product is durable, its outdoor service life can be more than 20 years, and the product can be recycled twice, and the problem of lacking solid wood is well solved.

The Eighth Embodiment

The embodiment of the present disclosure further provides a method for manufacturing a polyurethane composite floor, which includes:

A. spraying a release agent into a lower mold, spraying a protective paint layer 7, rolling a top paint layer 6, and spraying a primer layer 5 sequentially;

B. after the layers are dried, pouring elastic rubber materials in the lower mold, and forming a rubber elastomer layer 4;

C. placing an upper braided fibre layer 2 on the rubber elastomer layer 4;

D. pouring polyurethane foaming material;

The polyurethane foaming material is obtained by uniformly mixing following components in a mixing device by weight: polyether polyol 40~60 parts, isocyanate 40~60 parts, filler 10~30 parts, coupling agent 3~6 parts, fire retardant 8~16 parts, and additive 3~6 parts. Finally the polyurethane foaming material is poured into the mold;

E. after pouring polyurethane foaming material, placing an intermediate core material 1 in the lower mold, in the embodiment, the intermediate core material 1 is a honeycombed core material;

F. placing a lower braided fibre layer 3 on the intermediate core material 1;

G. closing the mold and curing;

H. demoulding and cleaning the mold;

I. removing excess flash, and obtaining the polyurethane composite floor.

It should be noted, that in Step D, the polyurethane foaming material may also be prepared according to the component ratios in the third embodiment or the fourth embodiment.

In addition, because the foamed layer, the rubber elastomer layer 4, the primer layer 5, the top paint layer 6, and the protective paint layer 7 are integrally formed by the mold, the chemical internal energies of self-reactions of the rubber elastomer layer and the polyurethane foaming material can be used to catalyze and cure mutually, which greatly saves the production energy consumption, and avoids the use of glue, the polyurethane composite floor is much more environmentally friendly and durable, and the processing process is simple.

The polyurethane foaming material is injected into the mold after the mold is closed, and the polyurethane foaming material foams and expands, and creates a molding environment with high temperature and high pressure in the mold. The upper braided fiber layer and the lower braided fiber layer are fixed on the intermediate core material by the polyurethane foaming material. Since the intermediate core material has the filling gaps, the polyurethane foaming material is filled in the filling gaps, so as to solve the problem of low strength at the filling gap, the intermediate core material and braided fiber layers form a whole, and the overall strength of the composite floor is increased.

It should be noted that, the polyurethane foaming material releases a lot of heat in the foaming process after the mold is closed, the volume becomes larger, and the mold cavity may be in a high pressure due to the limitation of the mold. In the high-temperature and high-pressure molding process, a surface of the polyurethane foaming material in contact with the upper mold may generate a crust due to the temperature difference of the molding surface of the upper mold, the crust has high density and higher strength. So, the lower surface of the product has higher strength, and the lower braided fiber layer is bound with the crust, and the lower braided fiber layer is fixed more firmly, which makes the whole product have higher strength. To sum up, the method utilizes the chemical internal energies of the self-reactions of rubber elastomer layer and the foamed layer to carry out the catalyzing and curing mutually, which greatly saves the production energy consumption and production cost.

The present application is not limited to the alternative embodiments as mentioned above, and any other form of products may be obtained by any person under the inspiration of the present application, the technical solutions falling within the defining scope of the claims of the present application fall within the protection scope of protection of the present application regardless of any change in its shape or structure.

What is claimed is:

1. A polyurethane composite floor, comprising: a foamed layer and a decorative layer arranged on the foamed layer, the foamed layer comprises an intermediate core material, two braided fibre layers respectively arranged on a top portion and a lower portion of the intermediate core material, the braided fibre layer arranged on the top end of the intermediate core material is defined as an upper braided fibre layer, the braided fibre layer arranged on the lower end of the intermediate core material is defined as a lower braided fibre layer, the intermediate core material defines a plurality of filling gaps, each filling gap is filled with a rigid polyurethane foam;

wherein the rigid polyurethane foam is composed of following components by weight: polyether polyol 40~60 parts, isocyanate 40~60 parts, filler 10~30 parts, coupling agent 3~6 parts, fire retardant 8~16 parts, and additive 3~6 parts;

wherein the decorative layer comprises a rubber elastomer layer, a primer layer, a top paint layer, and a protective paint layer which are arranged in sequence from bottom to top;

wherein the rubber elastomer layer is used to catalyze and cure mutually with the rigid polyurethane foam filled in the foamed layer;

wherein the upper braided fibre layer and the lower braided fibre layer are in a transverse plane extension state, and the intermediate core material constitutes a longitudinal support, thereby forming an H-shaped structure; and wherein the rigid polyurethane foam and the lower braided fibre layer are joined with a crust generated during a high-temperature and high-pressure molding process.

2. The polyurethane composite floor of claim 1, wherein the rigid polyurethane foam is composed of following components by weight: polyether polyol 40 parts, isocyanate 40 parts, filler 10 parts, coupling agent 3 parts, fire retardant 8 parts, and additive 3 parts.

3. The polyurethane composite floor of claim 1, wherein the rigid polyurethane foam is composed of following components by weight: polyether polyol 60 parts, isocyanate 60 parts, filler 30 parts, coupling agent 6 parts, fire retardant 16 parts, and additive 6 parts.

4. The polyurethane composite floor of claim 1, wherein the rigid polyurethane foam is composed of following components by weight: polyether polyol 50 parts, isocyanate 50 parts, filler 20 parts, coupling agent 5 parts, fire retardant 12 parts, and additive 5 parts.

5. The polyurethane composite floor of claim 1, wherein the braided fibre layer is at least one selected from artificial fiber, metal alloy wire, aramid fiber, quartz fiber, glass fiber, basalt fiber, and plant paper fiber.

6. The polyurethane composite floor of claim 1, wherein the intermediate core material is made of polymer material, metal material, organic biological material, or inorganic material.

7. A method for manufacturing a polyurethane composite floor as claimed in claim 1, comprising:

A. spraying a release agent into a lower mold, spraying a protective paint layer, rolling a top paint layer, and spraying a primer layer sequentially;

B. after the layers are dried, pouring elastic rubber materials in the lower mold, and forming a semi-cured rubber elastomer layer;

C. placing an upper braided fibre layer on the rubber elastomer layer, and realizing a preimpregnation of fibers on an upper surface of the rubber elastomer layer into the upper braided fibre layer;

D. pouring polyurethane foaming material in the lower mold, the polyurethane foaming material is fully infiltrated with the fibers in a lower surface of the upper braided fibre layer;

E. placing an intermediate core material in the lower mold after pouring polyurethane foaming material in the lower mold;

F. placing a lower braided fibre layer on the intermediate core material;

G. closing the mold and curing;

H. demoulding and cleaning the mold;

I. removing excess flash, and obtaining the polyurethane composite floor.

8. The method for manufacturing a polyurethane composite floor of claim 7, wherein in step D, the polyurethane foaming material is obtained by uniformly mixing following components in a mixing device by weight: polyether polyol 40~60 parts, isocyanate 40~60 parts, filler 10~30 parts, coupling agent 3~6 parts, fire retardant 8~16 parts, and additive 3~6 parts, then the polyurethane foaming material is poured in the mold.

* * * * *